(12) United States Patent
Crum

(10) Patent No.: US 10,655,695 B2
(45) Date of Patent: May 19, 2020

(54) DECELERATION BASED BRAKE COOLANT SYSTEM AND METHOD THEREOF

(71) Applicant: Allison Transmission, Inc., Indianapolis, IN (US)

(72) Inventor: Bruce E. Crum, Brownsburg, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 255 days.

(21) Appl. No.: 15/914,465

(22) Filed: Mar. 7, 2018

(65) Prior Publication Data

US 2018/0274614 A1 Sep. 27, 2018

Related U.S. Application Data

(60) Provisional application No. 62/474,160, filed on Mar. 21, 2017.

(51) Int. Cl.
*F16D 65/853* (2006.01)
*B60T 5/00* (2006.01)
(Continued)

(52) U.S. Cl.
CPC .............. *F16D 65/853* (2013.01); *B60T 5/00* (2013.01); *B60T 8/172* (2013.01); *F16D 2065/783* (2013.01); *F16D 2065/787* (2013.01)

(58) Field of Classification Search
CPC .................................................... F16D 65/853
See application file for complete search history.

(56) References Cited

U.S. PATENT DOCUMENTS 5,596,513 A * 1/1997 Schricker ................ B60T 8/172
188/264 D
6,106,080 A * 8/2000 Tozu ........................ B60T 8/24
303/10
(Continued)

FOREIGN PATENT DOCUMENTS

DE 10057880 A1 11/2001
KR 20040046366 A 6/2004
(Continued)

OTHER PUBLICATIONS

European Search Report & Written Opinion, European Patent Office, European Application No. 18162002, dated Jun. 11, 2018, pp. 1-5.

*Primary Examiner* — Alex C Dunn
(74) *Attorney, Agent, or Firm* — Taft Stettinius & Hollister LLP; Stephen F. Rost

(57) ABSTRACT

A motorized vehicle includes an engine, a transmission having an input coupled to the engine and an output, and a controller for controlling at least the transmission. A braking system includes a brake sensor and a brake pack configured to reduce a speed of the vehicle. The brake sensor is disposed in electrical communication with the controller. A main hydraulic pump is operably driven by the engine and an output hydraulic pump is operably driven by the transmission output. A brake coolant valve is disposed in fluid communication with the main hydraulic pump and the output hydraulic pump. The brake coolant valve is controlled between an open position and a closed position. The main hydraulic pump and the output hydraulic pump are fluidly coupled to the brake pack when the brake coolant valve is in its open position.

20 Claims, 8 Drawing Sheets

(51) Int. Cl.
B60T 8/172 (2006.01)
F16D 65/78 (2006.01)

(56) References Cited

U.S. PATENT DOCUMENTS

| | | | |
|---|---|---|---|
| 2007/0163851 A1* | 7/2007 | Alexander | F16D 55/22 |
| | | | 188/264 F |
| 2009/0024289 A1* | 1/2009 | Niino | B60T 8/442 |
| | | | 701/70 |
| 2012/0180480 A1* | 7/2012 | Kapich | F02B 37/10 |
| | | | 60/606 |
| 2012/0180481 A1* | 7/2012 | Kapich | F02B 37/10 |
| | | | 60/606 |
| 2013/0150211 A1* | 6/2013 | Aoki | B60K 6/46 |
| | | | 477/86 |
| 2014/0131150 A1* | 5/2014 | Nimura | B60L 1/003 |
| | | | 188/158 |
| 2014/0265170 A1* | 9/2014 | Giovanardi | F15B 13/0444 |
| | | | 280/5.5 |
| 2016/0298755 A1* | 10/2016 | Kotsuji | B60K 6/365 |
| 2017/0036514 A1* | 2/2017 | Umehara | B60H 1/00278 |
| 2017/0361698 A1* | 12/2017 | Hussain | F01P 5/06 |
| 2019/0048998 A1* | 2/2019 | Harada | F16H 61/662 |
| 2019/0085528 A1* | 3/2019 | Ono | E02F 9/24 |

FOREIGN PATENT DOCUMENTS

| | | | |
|---|---|---|---|
| KR | 20160050803 A | 5/2016 | |
| WO | 20150179776 A1 | 11/2015 | |

\* cited by examiner

DECELERATION BASED BRAKE COOLANT SYSTEM AND METHOD THEREOF

RELATED APPLICATIONS

This application claims the benefit of U.S. Provisional Application Ser. No. 62/474,160, filed Mar. 21, 2017, the disclosure of which is hereby expressly incorporated by reference in its entirety.

FIELD OF THE DISCLOSURE

The present disclosure relates to a method of controlling a transmission system, and in particular to a method of controlling oil flow to cool a temperature of a brake pack during or after a braking event.

BACKGROUND

In a conventional vehicle or work machine, a transmission system transfers torque from an engine or prime mover to a ground-engaging mechanism such as a wheel or track. In a tracked vehicle, for example, a transmission may transfer torque to the tracks to allow the vehicle or machine to move in a forward or reverse direction. The vehicle may include independent braking and steering systems that affect vehicle performance. The braking system may include one or more brake plates that form a pack. Repeated brake applications or braking events without allowing brake plates to cool sufficiently can cause damage to the brake pack. A damaged brake pack may negatively affect braking performance of the vehicle or work machine.

Many conventional braking systems consider only vehicle speed when controlling flow to the brakes for cooling. However, when a vehicle is travelling along a grade (e.g., travelling uphill), vehicle speed is often not representative of how much flow is required to cool the brakes.

Thus, a different control system and method is needed to control flow to the brakes of a vehicle or work machine in order to properly maintain braking performance and overall life of the brake packs.

SUMMARY

In one embodiment of the present disclosure, a motorized vehicle includes an engine for providing power; a transmission having an input coupled to the engine for receiving power, and an output configured to transfer the power to one or more wheels on the vehicle; a controller for controlling at least the transmission; a braking system of the vehicle including a brake sensor and a brake pack configured to reduce a speed of the vehicle, the brake sensor disposed in electrical communication with the controller; a main hydraulic pump operably driven by the engine and adapted to provide hydraulic fluid to the transmission; an output hydraulic pump operably driven by the transmission output; and a brake coolant valve disposed in fluid communication with the main hydraulic pump and the output hydraulic pump, the brake coolant valve being operably controlled between an open position and a closed position; wherein, the main hydraulic pump and the output hydraulic pump are fluidly coupled to the brake pack when the brake coolant valve is in its open position, and both pumps are not fluidly coupled to the brake pack when the brake coolant valve is in its closed position.

In a first example of the present embodiment, the controller is disposed in electrical communication with the main hydraulic pump and the output hydraulic pump. In a second example, the brake coolant valve includes an electro-hydraulic valve, and the controller is disposed in electrical communication with the brake coolant valve. In a third example, the controller operably controls the brake coolant valve between its open and closed positions. In a fourth example, the vehicle may include a speed sensor disposed in electrical communication with the controller, the speed sensor configured to detect a vehicle speed, an engine speed or a transmission output speed.

In a fifth example, a brake input device is operably controlled between a first position and a second position, the first position corresponding applying the brake pack and the second position corresponding to releasing the brake pack. In a sixth example, the brake sensor is disposed in communication with the brake input device and detects movement thereof between the first and second position. In a seventh example, the brake coolant valve is operably controlled to its open position when the brake input device is in its first position, and the brake coolant valve is operably controlled to its closed position when the brake input device is in its second position.

In another embodiment of the present disclosure, a method of providing an amount of hydraulic fluid to a braking system of a vehicle during or after a braking event includes providing an engine, a transmission having an input and an output, a controller, a main hydraulic pump, an output hydraulic pump, a brake coolant valve, a brake pack, a speed sensor, and a brake input sensor; receiving a first signal from the brake sensor indicating the brake pack is in an engaged position; communicating a first speed of the vehicle to the controller with the speed sensor; receiving a second signal from the brake sensor indicating the brake pack is in a disengaged position; communicating a second speed of the vehicle to the controller with the speed sensor; determining an amount of energy absorbed by the brake pack when the brake pack was disposed in the engaged position, the amount of energy absorbed being a function of a vehicle mass, the first speed, and the second speed; determining the amount of hydraulic fluid to supply to the brake pack as a function of the amount of energy absorbed; operably controlling the brake coolant valve to an open position; and supplying the amount of hydraulic fluid from the main hydraulic pump and the output hydraulic fluid to the brake pack.

In a first example of this embodiment, the method may include determining a first pump flow of the main hydraulic pump and a second pump flow of the output hydraulic pump, where the first and second pump flows are a function of pump capacity, pump speed, and time. In a second example, the method may include operably controlling the brake coolant valve from its open position to a closed position once the amount of hydraulic fluid has been supplied to the brake pack. In a third example, the determining an amount of energy absorbed step includes multiplying the vehicle mass by a difference between the first and second speeds.

In a fourth example, the determining an amount of hydraulic fluid step includes calculating the amount of hydraulic fluid based on the amount of energy absorbed, brake plate geometry of at least one brake plate in the brake pack, hydraulic fluid temperature, and at least one thermal property of the brake pack. In a fifth example, the supplying step includes fluidly coupling the main hydraulic pump and the output hydraulic pump to the brake pack. In a sixth example, the method may include fluidly de-coupling the output hydraulic pump from the brake pack after the supplying step.

In a further embodiment of the present disclosure, a method of supplying hydraulic fluid to reduce a temperature of a brake pack of a vehicle after a braking event includes providing an engine, a transmission having an input and an output, a controller, a main hydraulic pump, an output hydraulic pump, a brake coolant valve, a brake pack including a brake plate, a speed sensor, a brake input sensor, and a brake pressure sensor; receiving a signal from the brake sensor indicating the brake pack is engaged during the braking event; detecting a vehicle speed of the vehicle with the speed sensor and a brake pressure of the brake pack during the braking event; communicating the vehicle speed and brake pressure to the controller; determining an amount of energy absorbed by the brake pack during the braking event, the amount of energy absorbed being a function of the brake pressure, speed, a piston area, a radius of the brake plate, and a number of friction faces of the brake pack; determining the amount of hydraulic fluid to supply to the brake pack as a function of the amount of energy absorbed; operably controlling the brake coolant valve to an open position; and supplying the amount of hydraulic fluid from the main hydraulic pump and the output hydraulic fluid to the brake pack.

In one example of this embodiment, the method may include operably controlling the brake coolant valve from its open position to a closed position once the amount of hydraulic fluid has been supplied to the brake pack. In a second example, the determining an amount of hydraulic fluid step includes calculating the amount of hydraulic fluid based on the amount of energy absorbed, brake plate geometry of at least one brake plate in the brake pack, hydraulic fluid temperature, and at least one thermal property of the brake pack. In a third example, the supplying step comprises fluidly coupling the main hydraulic pump and the output hydraulic pump to the brake pack. In a further example, the method may include fluidly de-coupling the output hydraulic pump from the brake pack after the supplying step.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The terminology used herein is for the purpose of describing particular illustrative embodiments only and is not intended to be limiting. As used herein, the singular forms "a", "an" and "the" may be intended to include the plural forms as well, unless the context clearly indicates otherwise. Similarly, plural forms may have been used to describe particular illustrative embodiments when singular forms would be applicable as well. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
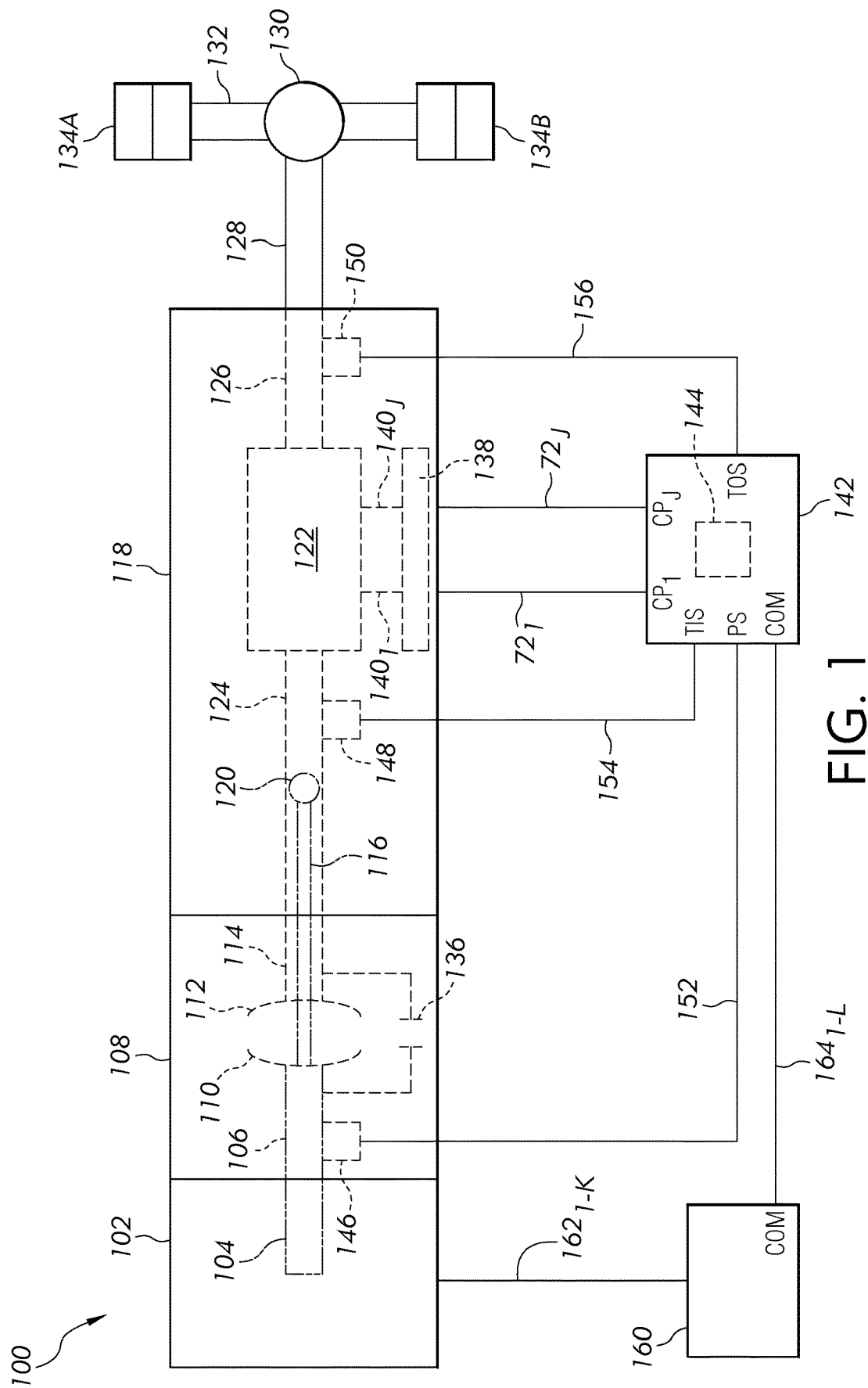
FIG. 1 is a block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when torque multiplication is not needed. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump 120 which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a Society of Automotive Engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Referring to FIG. 2, one embodiment of a transmission system 200 is illustrated. The transmission system 200 includes an input 202 and an output 284. Torque may be provided at the input 202 by an engine (not shown), prime mover, or other torque-producing system. In this embodiment, the transmission system 200 includes a first side 286 and a second side 288. As shown, there is an output 284 at each side. The output 284 represents the transmission output in this embodiment. Output torque from the transmission output 284 may be delivered to a final drive assembly or other system to drive a ground-engaging mechanism such as a wheel or track.

The transmission system 200 may include an input shaft 204 which receives torque from the engine (not shown). A speed sensor 206 may be provided to detect or measure input speed based on the rotation of the input shaft 204. Alternatively, input speed (or engine speed) may be communicated to a transmission controller 310 (FIG. 3) via a J-1939 communication link or any other known means. Input speed and other characteristics, such as input torque, may be communicated to the transmission controller 310 from an engine controller 302 according to known methods.

The transmission system 200 may include a fluid coupling device such as a torque converter 208. The torque converter 208 may include a pump and a turbine. Moreover, a lockup clutch 210 may be provided as will be described in further detail.

Torque passing through the torque converter 208 drives a turbine shaft 212, as shown. The turbine shaft 212 is coupled between the torque converter 208 and a bevel gearset 214. The bevel gearset 214 may include a drive gear 216, a first driven gear 218 and a second driven gear 220. The drive gear 216 may be directly connected to the turbine shaft 212, and each driven gear may be coupled to a directional clutch.

In FIG. 2, the transmission system 200 includes a first directional clutch 226 and a second directional clutch 228. The first directional clutch 226 may be selectively engaged to allow the transmission output 284 to rotate in a forward direction or a reverse direction. The second directional clutch 228 may be selectively engaged to allow the transmission output 284 to rotate in a direction opposite of when the first directional clutch 226 is selectively engaged. Moreover, the directional clutches allow range clutch packs and a hydrostatic steer unit (HSU) 240 to be driven in either direction. Other directional clutches may be provided besides the ones depicted in FIG. 2. Moreover, if the transmission system is in a neutral position or range, one of the directional clutches may be selectively engaged. In other words, in one example, at least one of the directional clutches may be engaged in each selected position or range. In another example, however, there may be at least one position or range whereby neither or none of the directional clutches are selectively engaged.

For purposes of this disclosure, a selected position or range may include any gear ratio, speed ratio, position on a shift selector, or combination thereof. A shift selector may include a park position, a reverse position, a forward position, a neutral position, and a pivot position. The forward position may include a "low" and a "high" position. This may vary depending upon the type of vehicle or machine and its intended use. A four-wheel drive vehicle, for example, may include a "four-wheel drive" position and a "two-wheel drive" position. Thus, this disclosure is not intended to be limiting as it relates to any known type of position on a shift selector or range or ratio attainable by a transmission.

A first shaft 222 may be coupled between the first driven gear 218 and the first directional clutch 226. A second shaft 224 may be coupled between the second driven gear 220 and the second directional clutch 228. In other embodiments, a hub or gear may directly couple each driven gear to the directional clutch. The transmission controller 310 may selectively control the engagement or disengagement of the directional clutches. Other control means, such as the shift selector 304, for selectively engaging or disengaging the directional clutch is also possible. In any event, when the first directional clutch 226 is engaged, torque may transfer from the drive gear 216 to the first directional clutch 226 via the first driven gear 218 and the first shaft 222.

The output of each directional clutch is coupled to a range input gearset 230. The range input gearset 230 may include one or more gears. In FIG. 2, the range input gearset 230 includes a first range gear 232, a second range gear 234, and a third range gear 236. The first range gear 232 may be directly coupled to the output of whichever directional clutch is engaged. Thus, torque passes through the engaged directional clutch to the first range gear 232, which is connected to the second range gear 234. The second range gear 234 is coupled to the third range gear 236, which is coupled to an input of the HSU 240. The input of the HSU 240 drives a pump 242, and the pump 242 drives a motor 244 which functions as an output of the HSU 240.

A hydrostatic steer unit disconnect mechanism 266 may be provided to disconnect the HSU 240 from being connected to the transmission output 284. In one embodiment, the HSU disconnect mechanism 266 is a clutch. In another embodiment, it may be a dog clutch, a mechanical diode, or any other type of selectively engageable device. The HSU disconnect mechanism 266 may normally be engaged so that the HSU 240 is connected to the transmission output 284. However, when the HSU disconnect mechanism 266 is selectively disengaged or de-energized, then the HSU 240 may be disconnected from the transmission output 284. When it is disconnected, the HSU 240 may still receive torque from the range input gearset 230, but the HSU 240 is unable to transfer any torque to the output 284.

A speed sensor 238 is also shown in FIG. 2. The speed sensor 238 can measure the rotational speed at a location downstream or after the directional clutches. Here, the speed sensor 238 can measure a rotational speed from the second range gear 234 so that both speed and direction are detectable. Thus, the speed sensor 238 may detect both rotational speed and direction in at least one embodiment. In this disclosure, the speed detected by the speed sensor 238 may be referred to as turbine speed.

The transmission system 200 may also include a direct drive pivot clutch 246. The direct drive pivot clutch 246 may be selectively engaged to allow the transmission system 200 to operate in a pivot mode. The direct drive pivot clutch 246 may normally be disengaged so that torque is transferred directly from the engaged directional clutch to the HSU 240. However, when the direct drive pivot clutch 246 is engaged, torque may transfer from the selectively engaged directional clutch through the direct drive pivot clutch 246 to a steer drive geartrain 254. The steer drive geartrain 254 may include the range input gearset 230, a first direct drive gear 250, a second direct drive gear 252, a steer transfer shaft 256, and a steer planetary gearset 258.

When the direct drive pivot clutch 246 is engaged, torque may pass from the selectively engaged directional clutch through the direct drive pivot clutch 246 to rotationally drive a direct drive shaft 248. The direct drive shaft 248 may be coupled to the first direct drive gear 250 and the second direct drive gear 252. The steer transfer shaft 256 may be coupled to the second direct drive gear 252 so that torque splits to the first side 286 and the second side 288 of the transmission system 200. When the direct drive pivot clutch 246 is disengaged, torque may be received from the HSU 240 and split via the steer transfer shaft 256 to both sides of the transmission system 200.

The steer planetary gearset 258 may include a sun gear 260, a carrier member or assembly 262, and a ring gear 264. As shown, the ring gear 264 may be connected to a housing of the transmission system 200 and thus is fixed from rotation. Input to the planetary gearset 258 is via the sun gear 260, and output is via the carrier member 262. The HSU 240 may be connected to the sun gear 260 under normal circumstances, and it is only disconnected when the HSU disconnect mechanism 266 is selectively controlled to its disengaged position or state. Thus, when the HSU disconnect mechanism 266 is engaged, torque may transfer from the HSU 240 into the steer planetary gearset 258 via the sun gear 260 and output via the carrier member 262. The carrier member 262 may be coupled to a steer gear 270, which in turn is coupled to the steer transfer shaft 256. Moreover, torque from the carrier member 262 may also be transferred to a second steer gear 268 which is coupled to an output planetary gearset 272.

When the HSU disconnect mechanism 266 is selectively controlled to its disengaged position, i.e., during a direct drive pivot or pivot lockup mode, torque is not transferred via the HSU 240. Instead, the direct drive pivot clutch 246 is engaged, as described above, and torque passes through the steer planetary gearset 258 via the carrier member 262. In other words, there is no torque passing to the sun gear 260. The carrier member 262 is coupled to a sun gear 274 of the output planetary gearset 272 via the second steer gear 268.

The output planetary gearset 272 may include the sun gear 274, a carrier assembly or member 276, and a ring gear 278. Here, the sun gear 274 is the input of the output planetary gearset 272, and the carrier member 276 is the output of the gearset. The ring gear 278 may be coupled to a shaft 282 which may be splined to another gear or gearset (not shown). The carrier member 276 may be held or fixed from rotation by a brake 280, as shown in FIG. 2B.

The carrier member 276 is coupled to a transmission output shaft. There may be one or more output shafts. In one example, the carrier member 276 on the first side 286 is coupled to one output shaft, and the carrier member 276 on the second side 288 is coupled to a second output shaft. In any event, the one or more output shafts may be coupled, either directly or indirectly, to the transmission output 284.

When steering the vehicle or machine and operating the transmission system 200 in range (e.g., in a forward or reverse direction), torque is transferred through the HSU 240. However, the HSU 240 incurs losses when torque passes therethrough. The same is true with the torque converter 208. These losses reduce the overall efficiency of the transmission system 200. When an operator wants to pivot the vehicle or machine, e.g., to make a 90° turn, it is desirable to reduce the losses of the torque converter 208 and HSU 240 and directly connect engine or input power to the steer drive geartrain 254. In addition, it is desirable to pivot the vehicle or machine without overheating the transmission system 200. To achieve high efficiency and avoid overheating the transmission system 200 during a pivot operation, it is desirable to provide a high efficiency pivot steer system. This may be achieved in at least one embodiment by disconnecting the HSU 240 and engaging lockup clutch 210.

Figure 3:
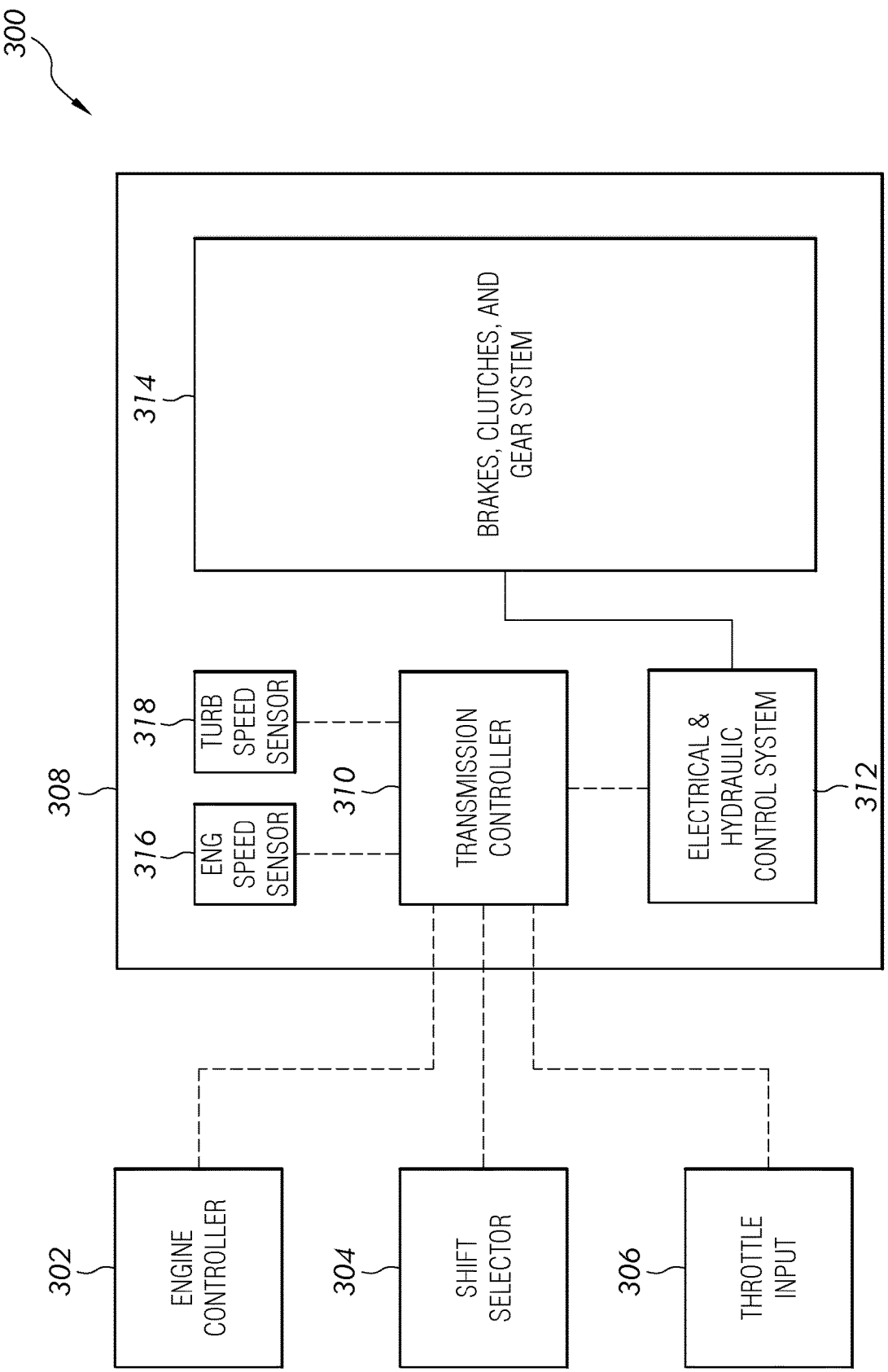
FIG. 3 is a diagram of a controls system of the transmission system of FIG. 2.

Referring to FIG. 3, a vehicular controls system 300 is shown in FIG. 3. In this system 300, a vehicle or machine may include an engine or prime mover (not shown) that is operably controlled by an engine controller 302. An operator can selectively control the vehicle or machine by a shift selector 304 and a throttle input 306. The throttle input 306 may be a sensor that detects when an operator depresses an accelerator or throttle pedal. The sensor may communicate an electrical signal indicative of the amount of throttle desired by the operator. Other control mechanisms may be used by an operator to indicate a desired throttle input. Moreover, other control mechanisms including a brake system, steering system, and the like may further be included in the controls system 300.

As previously described, the shift selector 304 may be controlled by the operator to control both steering and direction of travel of the vehicle or machine. The shift selector 304 may include a plurality of positions such as forward, reverse, neutral and pivot. Other positions may include park, high, low, etc. The shift selector 304 may include a sensor that detects movement of the shift selector 304 to each of its plurality of positions.

The vehicular controls system 300 further includes a transmission system 308, which may be similar to the transmission system 200 of FIG. 2. The transmission system 308 may include a transmission controller 310, an electrical and hydraulic control system 312 such as a valve body with valves, solenoids, and other control elements, and a geartrain 314. The transmission controller 310 may be in electrical communication with the sensors that detect movement or changes to the shift selector 304 and throttle input 306. In FIG. 3, a dashed line represents an electrical connection (wired or wireless) and a solid line represents a hydraulic, mechanical or electrohydraulic connection. The transmission controller 310 may be in electrical communication with the engine controller 302 for receiving or communicating various commands or instructions. In one example, engine speed may be communicated via the engine controller 302 to the transmission controller 310 over a J-1939 communication link.

The control system 312 of FIG. 3 may include a plurality of electrical and hydraulic control mechanisms such as solenoids, valves, sensors, etc. The control system 312 may be similar to the electro-hydraulic system 138 of FIG. 1. In at least one embodiment, the control system 312 may include a valve body with a plurality of fluid paths defined therein.

Referring to FIG. 3, sensors such as an input or engine speed sensor 316 and a turbine speed sensor 318 may also be included. The engine speed sensor 316 of FIG. 3 may correspond with the speed sensor 206 of FIG. 2, and the turbine speed sensor 318 may correspond with the other speed sensor 238 referenced in FIG. 2. The input speed sensor 316 and turbine speed sensor 318 may be in electrical communication with the transmission controller 310, as shown. Other sensors may be included in the transmission system 308 such as an output speed sensor, input torque sensor, output torque sensor, etc.

The geartrain 314 may include a plurality of friction devices, clutches, brakes, gears, shafts, etc. The plurality of friction devices may include, but are not limited to, one or more conventional brake devices, one or more torque transmitting devices, and the like. Similar to FIG. 1, the operation, i.e., engagement and disengagement, of the plurality of friction devices is controlled by selectively controlling the friction applied by each of the plurality of friction devices, such as by controlling fluid pressure to each of the friction devices. In one example, which is not intended to be limiting in any way, the plurality of friction devices includes a plurality of brake and torque transmitting devices in the form of conventional clutches that may each be controllably engaged and disengaged via fluid pressure supplied by the control system 312.

In a further example, the steer drive geartrain 254 may be part of the geartrain 314. In addition, the bevel gearset 214, the first directional clutch 226, the second directional clutch 228, and the direct drive pivot clutch 246 may be included in the geartrain 314. In a further example, the HSU disconnect mechanism 266 may be included in the geartrain 314. Moreover, the steer planetary gearset 258 and output planetary gearset 272 may be included as part of the geartrain 314. In at least one embodiment, each gear, shaft, clutch, brake, and planetary gearset may form part of the geartrain 314 of FIG. 3.

Figure 2A:
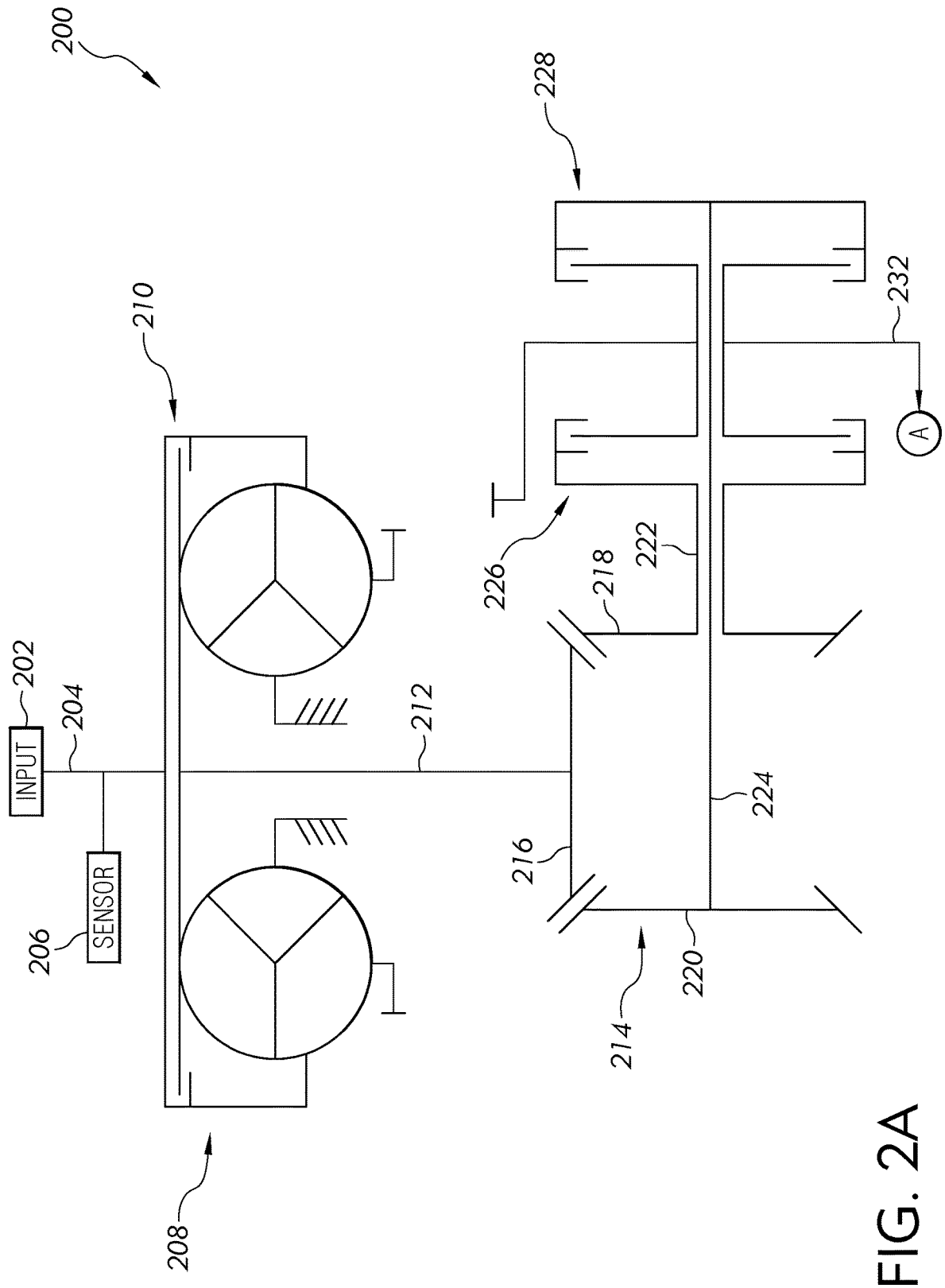
FIG. 2A is a first partial schematic view of a transmission system including a pivot steer system.
Figure 2B:
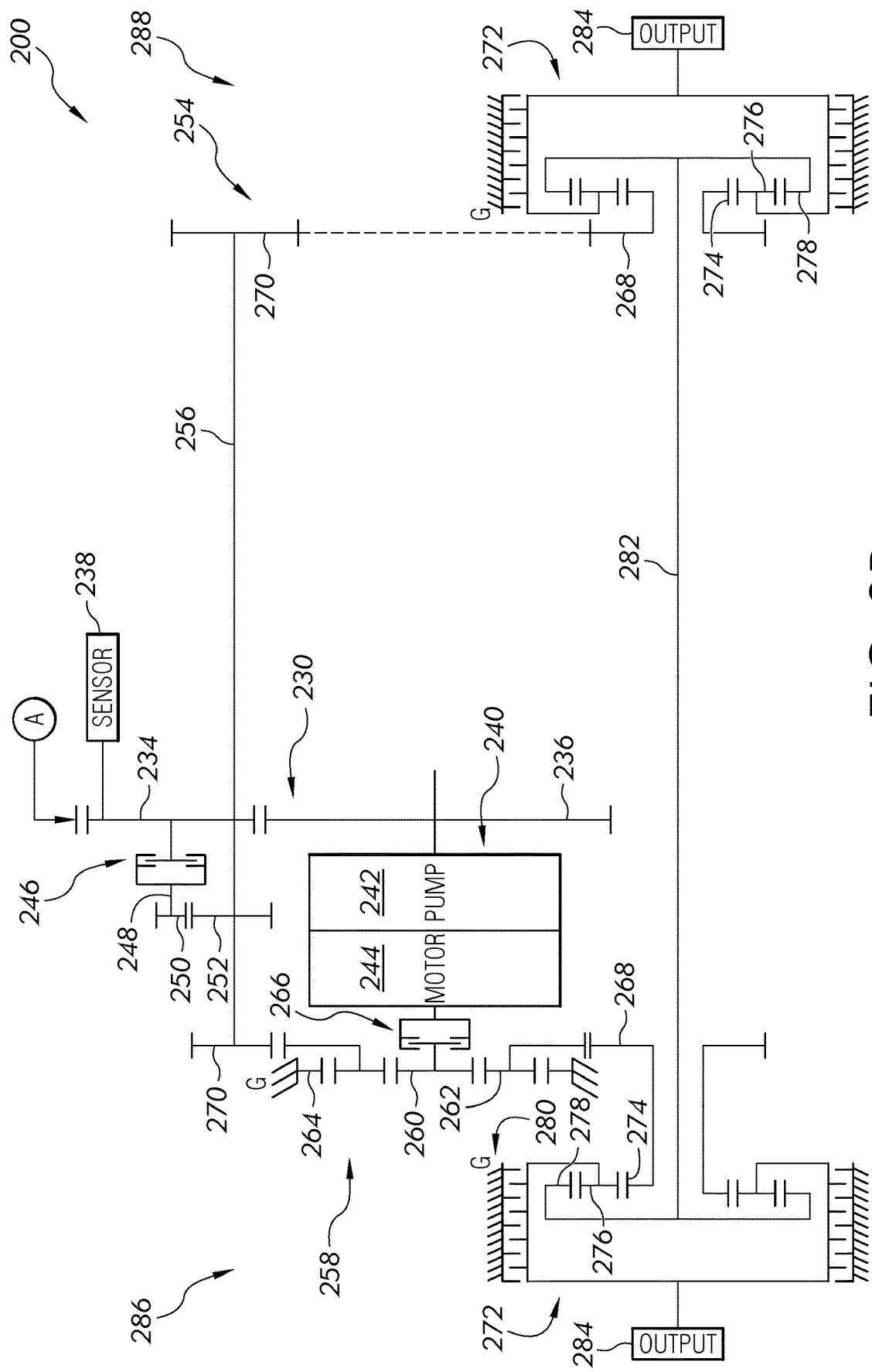
FIG. 2B is a second partial schematic view of the transmission system of FIG. 2A including a pivot steer system.

As previously described, conventional cross-drive transmissions similar to the one depicted in FIGS. 2A-B include completely independent braking and steering systems. In other words, both systems operate independent of the other and there is little to no overlap therebetween. A braking system may include a brake actuator for controllably operating a brake pack on the transmission output. When an operator actuates a brake pedal, for example, the braking system equally applies the brakes on each transmission output.

Figure 4:
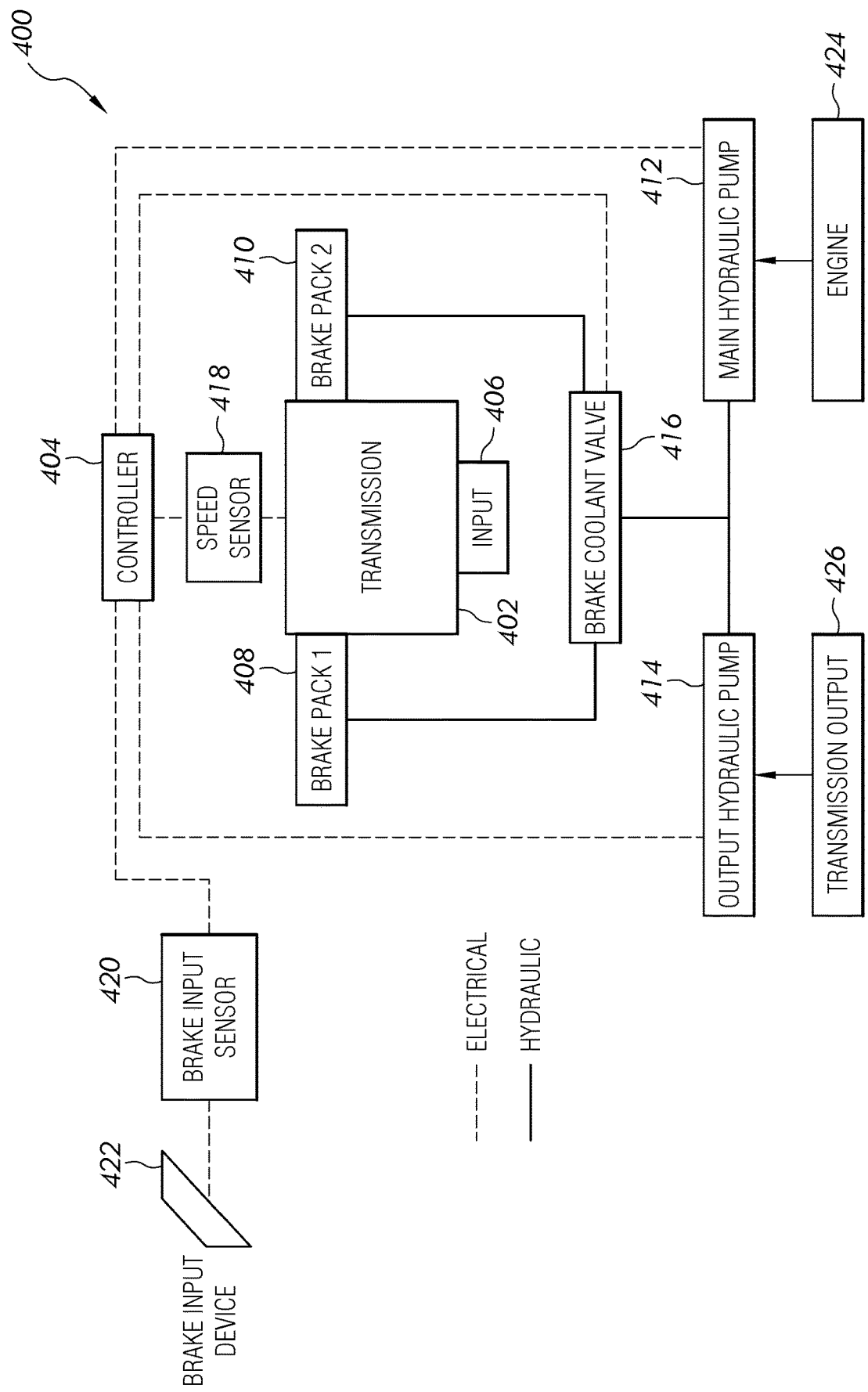
FIG. 4 is a first embodiment of a control system for managing brake pack temperature.

Referring to FIG. 4, a control system 400 for automatically monitoring a transmission brake system is illustrated. The system 400 is designed to monitor energy absorption during or after a braking event to maximize or improve brake plate life. The system 400 may include a transmission 402. The transmission 402 may be a cross-drive transmission similar to that shown in FIGS. 2A and 2B. The transmission 402 may be part of any known vehicle or work machine, including but not limited to any vehicle with fluid-cooled brakes such as a construction vehicle, an agricultural machine, a mining machine, or military vehicle.

The control system 400 may further include a controller 404 for maintaining a sufficient or maximum amount of brake coolant flow during and after a braking event until component temperatures return to a predefined value. As will be described herein, during a braking event, the controller 404 may calculate an amount of energy required to stop or brake the vehicle and the power absorbed by the brakes as a function of transmission output speed profile. Hydraulic pumps may be controlled such that one or more pumps remains at maximum flow until a necessary amount of fluid is supplied to the brakes to return them to a predefined temperature.

The transmission 402 may include an input 406 and at least one output 426. In FIG. 4, a first brake pack 408 and a second brake pack 410 are shown. Each brake pack may include a plurality of brake plates that are engaged to slow or stop the transmission output.

In the control system 400, a main hydraulic pump 412 can provide hydraulic flow to the transmission for controlling clutches, pistons, and other hydraulic components of the transmission 402. The main hydraulic pump 412 may be powered by output power from an engine, prime mover, or auxiliary power source 424. Thus, when the engine, prime mover, or auxiliary power source 424 is shut off, the main hydraulic pump 412 cannot provide any hydraulic flow to the transmission 402.

The control system 400 may also include an output hydraulic pump 414. The output hydraulic pump 414 may be driven by the transmission output 426 or output shaft. So long as the transmission output 426 is rotating, the output hydraulic pump 414 may provide hydraulic fluid to the transmission 402. When the vehicle stops and the transmission output no longer rotates, the output hydraulic pump 414 is unable to provide fluid to the transmission 402. As a result, brake application may be accomplished primarily by hydraulic fluid from the main hydraulic pump 412.

When the vehicle is moving, hydraulic fluid from the output hydraulic pump may be fluidly coupled to a controls circuit (not shown) of the transmission 402 along with hydraulic flow from the main hydraulic pump 412. A check valve (not shown) may be provided in the fluid connection between the output hydraulic pump 414 and the controls circuit or main hydraulic pump 412. In addition, a bypass valve (not shown) may also be provided such that if the engine, prime mover, or auxiliary power source 424 locks up and there is no steering capability, the output hydraulic pump 414 may still provide hydraulic fluid to the controls circuit. In other words, the bypass valve may open to allow flow from the output hydraulic pump 414 when there is no flow from the main hydraulic pump 412 or the main hydraulic pump 412 is inoperable.

The controls circuit, or hydraulic controls circuit, of the transmission 402 may also include a brake coolant valve 416. When the first and second brake packs 408, 410 are actuated either with an actuator or hydraulically, the brake coolant valve 416 may be opened or energized to allow hydraulic fluid from the main hydraulic pump 412 and output hydraulic pump 414 to cool the brake packs. The brake coolant valve 416 may be an electro-hydraulic valve that includes a solenoid which is energized or de-energized by the controller 404. The valve 416 may, however, be any type of control valve that may be controlled between an open and closed position. When open, fluid may flow from both pumps to the brake packs, and when closed, fluid is unable to flow to the brakes. For example, the main hydraulic pump 412 may hydraulically control the application of the brake packs, and when the brake coolant valve 416 is closed, flow is unable to be transferred from either pump to the brakes. However, when the brake coolant valve 416 opens, fluid may be provided by both pumps.

A brake apply command may be communicated to the controller 404 from a brake input sensor 420. Here, when an operator applies a brake input device 422 (e.g., a pedal, button, lever, etc.), the brake input sensor 420 detects a command from the operator to apply the brakes. As such, a signal may be sent to the controller 404 indicating a desire to apply the brake packs 408, 410. Upon receiving the signal, the first brake pack 408 and second brake pack 410 may be applied to slow the vehicle or transmission output. Moreover, the controller 404 may control the brake coolant valve 416 from its closed position to its open position so that hydraulic fluid from both pumps may be output to cool the brake packs. The amount or volume of hydraulic fluid supplied to cool the brake packs is precisely controlled so that there is still sufficient fluid for the controls circuit to control the transmission 402.

Figure 5:
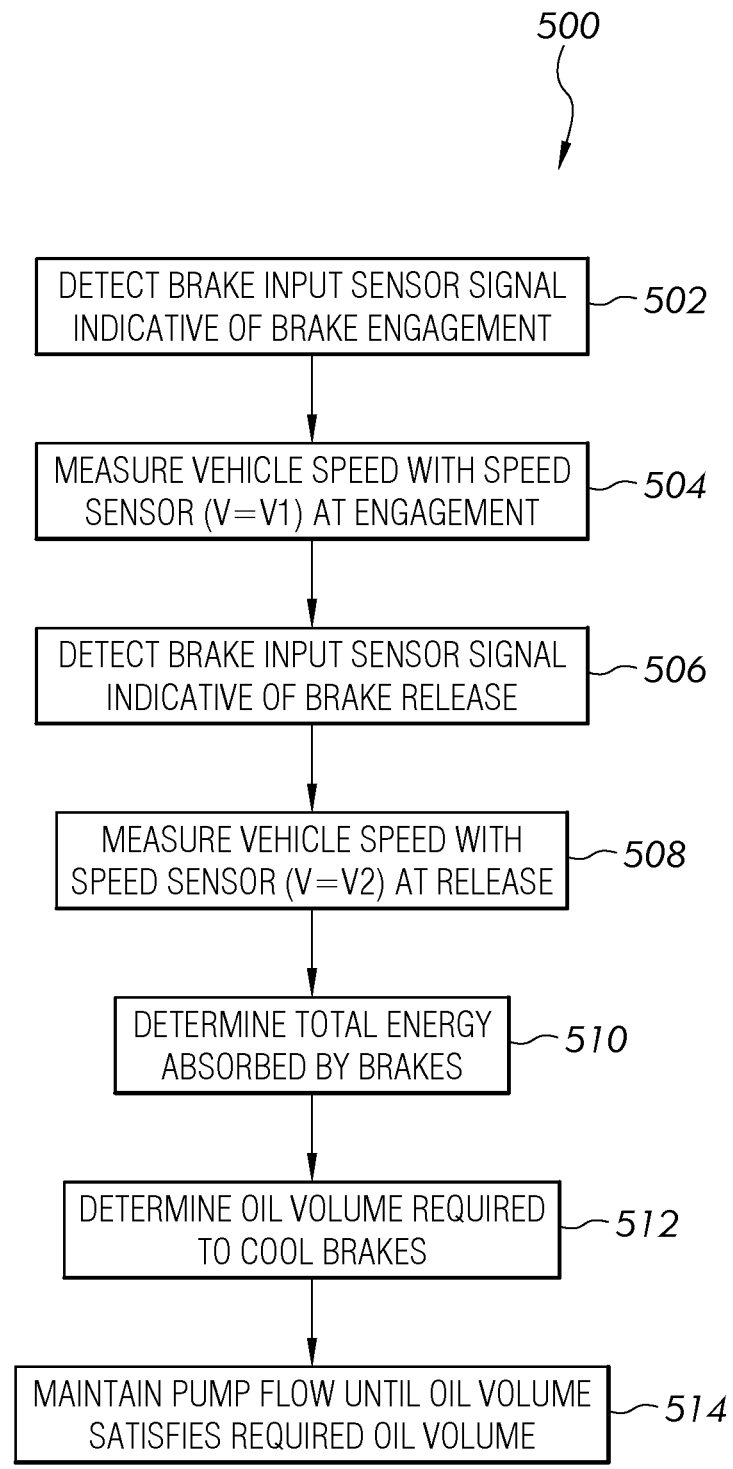
FIG. 5 is a control process for cooling brake packs after a braking event.

A control system 400 of FIG. 4 may execute a control process for controlling the amount of hydraulic fluid supplied to the brake packs to ensure proper cooling. An example of one such control process 500 is illustrated in FIG. 5. The control process 500 may be executed by performing one or more blocks or steps. In a first block 502 of FIG. 5, the controller 404 may continuously monitor the brake input sensor 420 and detect when a signal is transmitted therefrom indicative of a brake command or engagement. Once the controller 404 receives a signal in block 502 indicating that a brake command has been instructed (e.g., by the operator), the control process 500 may advance to block 504 in which the controller 404 communicates with the speed sensor 418 to detect vehicle speed. Here, the vehicle speed measured when the brake input sensor signals to the controller 404 that the brakes have been applied may be designated as V1.

Once the brakes are released, the brake input sensor 420 may communicate a second signal to the controller 404 indicating that the brake packs 408, 410 have been released in block 506. Again, the controller 404 communicates with the speed sensor 418 to detect the vehicle speed when the brakes are released in block 508. This second vehicle speed may be designated as V2. The vehicle speeds may be used to capture an output speed or vehicle speed profile, from which the controller 404 can calculate how energy was input to the brakes during the braking event. In particular, the amount of deceleration during the braking event may be captured through this calculation or determination.

In block 510 of the control process 500, the controller 404 may determine the amount of energy absorbed by the brakes during the braking event. The amount of energy may be determined from the following equation:

$$\text{Total Energy Absorbed} = \frac{1}{2} * \text{Vehicle Mass} * (V1^2 - V2^2)$$

The mass of the vehicle may be predefined or otherwise communicated to the controller 404 by the operator or determined according to any known means. Once the total energy absorbed by the brakes is determined in block 510, the control process 500 may advance to block 512 where the controller 404 may determine an oil volume or amount of oil required to sufficiently cool the brake packs 408, 410. To do so, the controller 404 can determine the oil volume from the following equation:

$$\text{Oil Volume} = \text{Total Energy Absorbed}/\text{Heat Transfer Algorithm}$$

Here, the controller 404 may determine a certain oil volume or flow of oil (e.g., in gallons per minute) required to flow past or between the plates of each respective brake pack at a given temperature that will cause the heat to be removed or transferred therefrom. In the above equation, heat transfer inputs may include brake plate geometry, brake plate thermal properties, oil temperature, and oil flow and thermal properties. Many or all of these inputs may be predefined or determined by the controller 404 or another sensor. For example, a temperature sensor or thermocouple (not shown) may detect the temperature of the hydraulic fluid. The heat transfer algorithm may be developed analytically or experimentally, and is stored as one or more equations in a memory unit of the controller 404.

Once the oil volume or amount of hydraulic fluid required to cool the brake packs is determined in block 512, the controller 404 can operably control or communicate with the main hydraulic pump 412, the output hydraulic pump 414, and the brake coolant valve 416 until the requisite amount of hydraulic fluid is supplied to each brake pack. This may be repeated for each brake event to ensure the brake packs are capable of operating at optimal performance levels and the life of each pack is maximized.

Although not shown, a temperature sensor may be provided to detect the real-time temperature of each brake pack and communicate the temperature to the controller 404. In this example, the controller 404 can operably control the brake coolant valve 416 to its open position until the temperature satisfies a predefined threshold or criteria. Once it does, the controller 404 may operably control the brake coolant valve 416 to its closed position.

The control of the brake coolant valve 416 is not dependent, however, upon receiving temperature measurements. Instead, the controller 404 may operably control the position of the valve 416 during and after a braking event and maintain it in its open position until the requisite amount of oil determined in block 512 has been supplied to the brake packs.

In a related example, the controller 404 may also determine or calculate pump flows from the main hydraulic pump 412 and output hydraulic pump 414 during and after the braking event based on pump speed profiles. Here, the main hydraulic pump 412 speed profile may be based upon engine speed, and the output hydraulic pump 414 speed profile may be based upon transmission output speed. The controller 404 may use pump capacity (e.g., in terms of gallons per revolution), pump speed (revolutions/minute), and time (minutes). Based on these inputs, the amount of oil (gallons) may be determined by multiplying each input (i.e., pump capacity, pump speed, and time). The controller 404 can control the pump flows to be a maximum or near maximum flow until the requisite amount of oil is supplied. Here, the pump speeds may be proportional or approximately proportional (minus any losses) to the amount of hydraulic flow that is output from the pumps.

In another embodiment of the present disclosure, a control system 600 for automatically monitoring a transmission brake system and controlling brake temperature following a braking event is illustrated. In particular, and similar to the system 400 in FIG. 4, the control system 600 is designed to monitor energy absorption during or after a braking event to maximize or improve brake plate life. Many of the components of the control system 400 in FIG. 4 are the same as or similar to those in FIG. 6. A transmission 402 is provided with a controller 404 for controlling transmission functionality. The transmission 402 may include an input 406, an output 426, a first brake pack 408 and a second brake pack 410. A main hydraulic pump 412 may provide hydraulic fluid for controlling the transmission 402, and an engine, prime mover, or auxiliary power source 424 may operably drive the main hydraulic pump 412. A second pump, i.e., an output hydraulic pump 414, may be driven by the transmission output 426. The main hydraulic pump 412 may supply hydraulic fluid to control the brake packs during a braking event, whereas both pumps may supply fluid after the braking event to cool the brakes. In doing so, a brake coolant valve 416 may be operably controlled by the controller 404 to open or close, thereby sending fluid from the hydraulic pumps 412, 414 to the brake packs 408, 410.

A speed sensor 418 may be provided to measure vehicle speed, transmission output speed, engine speed, or any other type of speed. There may be more than one speed sensor for measuring different speeds. The speed sensor 418 may be in electrical communication with the controller 404 to communicate the speed or speeds thereto. In addition, a brake input device 422 may be actuated by an operator, for example, in order to apply or engage the brake packs during a braking event. A brake input sensor 420 may detect when the brake input device 422 is actuated, and send a signal to the controller 404 indicating when the brake input device 422 is actuated.

Figure 6:
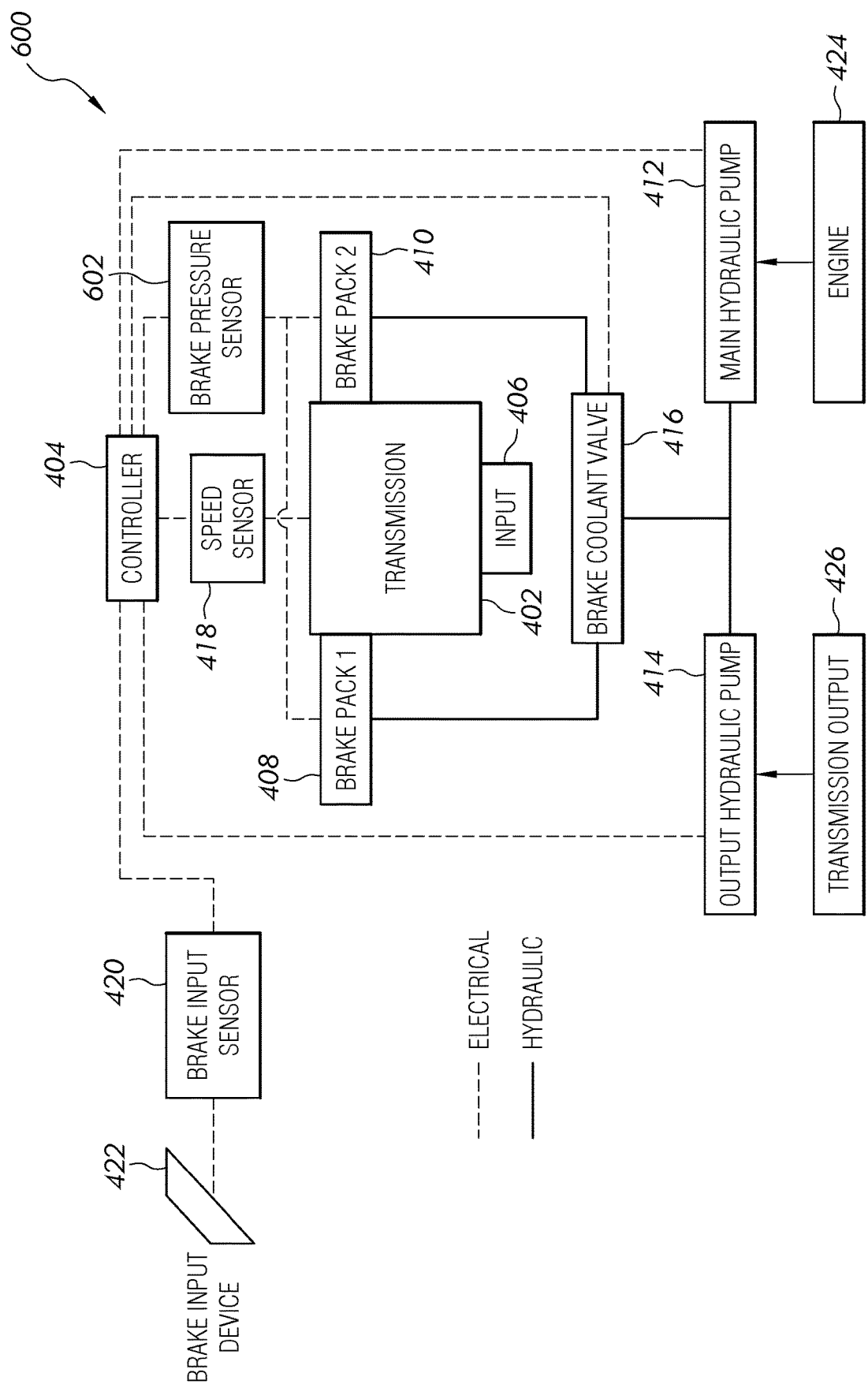
FIG. 6 is a second embodiment of a control system for managing brake pack temperature.

In FIG. 6, the control system 600 may also include a brake pressure sensor 602. The brake pressure sensor 602 may include one or more sensors for detecting an amount of force or pressure applied to each brake pack. The brake pressure sensor 602 may be in communication with the controller 404 to communicate how much pressure or force is applied to the brake packs 408, 410. Once the controller 404 receives the brake force or pressure, the amount of torque applied to the respective brake pack may be determined as a function of brake plate geometry. Moreover, the amount of energy absorbed by the brake plates may be determined as a function of torque and speed. A lookup table or formula may be used by the controller 404 to calculate the amount of energy absorbed in a similar manner, where the table may include relevant information related to the brake plates. The amount of oil needed to reduce brake plate temperature to a desired temperature may also be stored in a table as a function of total energy absorbed. For instance, if the amount of energy absorbed by the brakes is determined, a resulting increase in brake pack temperature may be determined and communicated to the controller 404. Once the temperature is known or determined, the controller 404 can control the brake coolant valve 416 to its open position so that enough hydraulic fluid is supplied to the brake packs to reduce their temperature.

Figure 7:
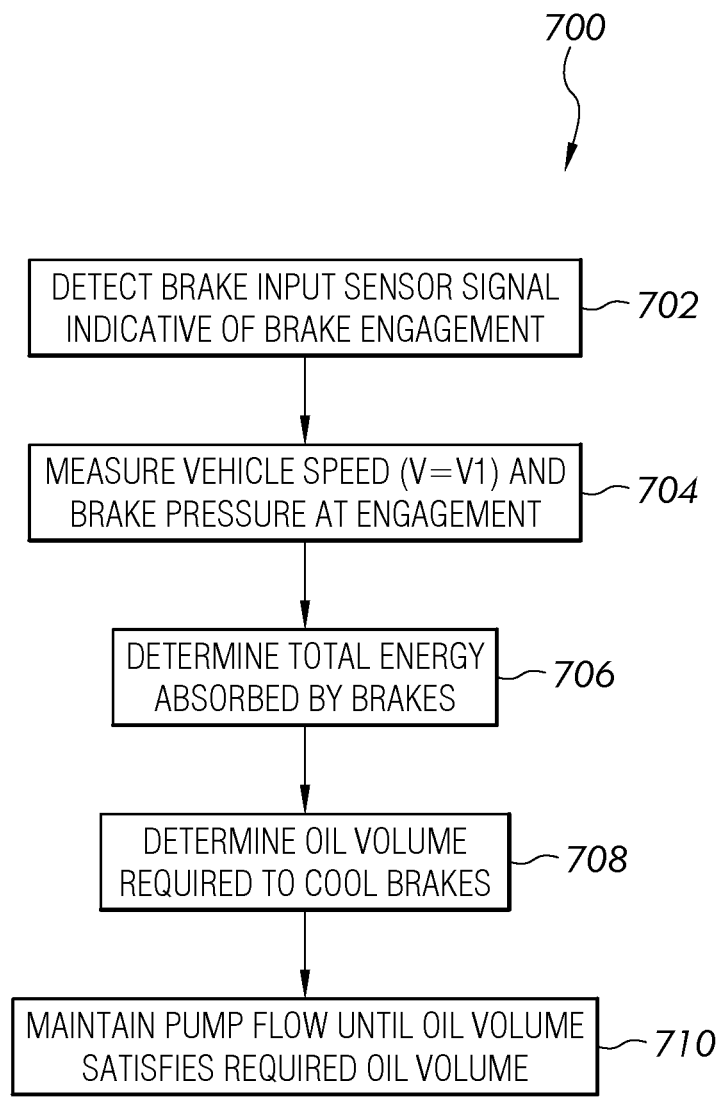
FIG. 7 is a second control process for cooling brake packs after a braking event.

A different control process 700 for controlling the amount of oil supplied to the brakes after a braking event is illustrated in FIG. 7. Similar to the control process 500 of FIG. 5, the control process 700 in FIG. 7 may include one or more blocks or steps that are executed for cooling the brakes. In a first block 702, the brake input sensor 420 may detect application of the brake input device 422 or engagement of the brake packs and communicate a corresponding signal to the controller 404. Once the controller 404 receives the signal from the brake input sensor 420 indicating that the brake packs 408, 410 have been engaged, a braking event is detected and the control process 700 may advance to block 704. In block 704, the speed sensor 418 may detect vehicle speed and communicate the speed to the controller 404. Alternatively, the speed sensor 418 may communicate engine speed or transmission output speed to the controller 404, and the controller 404 may convert the detected speed to vehicle speed according to any known method.

In addition, the brake pressure sensor 602 may detect brake pressure being applied to each or at least one brake pack and communicate the pressure to the controller 404 in block 704. As such, in block 706 the controller 404 is able to calculate or otherwise determine the total amount of energy absorbed by the brake packs during the braking event as a function of the speed and pressure detected in block 704. To do so, the controller 404 can calculate a number of brake revolutions as a function of speed (e.g., in terms of revolutions per minute) and time. For unit conversion, the revolutions is multiplied by 2*Π radians/revolution and then multiplied by a radius equivalent to a distance travelled by a tangential force (e.g., Force×Distance=Energy). Brake revolutions may be calculated as follows:

Brake Revolutions=Speed*Time

The total energy absorbed by the brakes may be calculated as a function of brake revolutions, brake pressure as detected by the brake pressure sensor 410, piston area, number of friction plates in each brake pack, a predefined brake plate coefficient of friction, and plate radius. Although not shown in any of the drawings, the piston area refers to the area of a face of an apply piston that is acted upon by the hydraulic apply fluid. The above calculation may be made as follows:

Energy=Brake Revolutions*Brake Pressure*Piston Area*Number of Friction Plates*Coefficient*Plate radius Once the total energy is determined in block 706, the control process 700 may advance to block 708 in which the oil volume required to cool the brakes may be determined. To do so, the oil volume may be determined as a function of energy absorbed and a heat transfer algorithm. The heat transfer algorithm may be established similar to that previously described, i.e., a calculation that is based on one or more equations stored in the memory unit of the controller. Inputs to the heat transfer algorithm may include brake plate geometry, brake plate thermal properties, oil temperature, oil flow properties, and oil thermal properties.

The pump flows of both the main hydraulic pump 412 and the output hydraulic pump 414 may be determined during and after the braking event. This may be determined based on the pump speed profiles. Inputs to this may include pump capacity (gallons/revolution), pump speed, and time (e.g., amount of time the pump supplies oil to the brakes). As an example, the volume may be determined based on the following equation:

Oil Volume Required=Pump Capacity*Pump Speed*Time

Pump capacity may be a known or predefined value provided to the controller 404, and pump speed is related to either transmission output speed or engine speed. As noted above, these speeds may be detected by the speed sensor 418 (which may include one or more speed sensors). Both pumps may be controlled to supply oil to the brake packs until the oil volume required to cool the brakes is achieved. The brake coolant valve 416 may be controlled to its open position to allow hydraulic fluid to be delivered by the pumps to the brakes until the requisite amount of oil is supplied in block 710.

The aforementioned control processes may include conditional algorithms that are executed before the control process. In one example, the controller 404 may determine if the brake command lasts longer than a predefined amount of time (e.g., less than 1 second). Here, the controller 404 ensures that the operator did not unintentionally tap the brake or otherwise did not intend to apply the brake. In addition, if the engine is shutdown or otherwise becomes inoperable such that the main hydraulic pump 412 is unable to provide fluid to the brakes, the controller 404 may determine if enough fluid is supplied to the transmission before an overflow amount of fluid is supplied to the brakes. Other conditional evaluations may be performed by the controller 404 before entering or executing either control process.

In the embodiments described above and shown in FIGS. 4 and 6 of this disclosure, the respective control systems include both a main hydraulic pump 412 and an output hydraulic pump 414. As described, the engine 424 operatively powers the main hydraulic pump 412 and the transmission output 426 operatively powers the output hydraulic pump 414. In an alternative embodiment of a control system of a cross drive transmission, however, it is possible to only have the main hydraulic pump 412. In other words, the alternative control system may control brake application and cooling via hydraulic fluid from only the main hydraulic pump 412. As a result, a check valve and brake coolant valve 416 may be optional in this alternative embodiment. In blocks 514 and 710, the controller 404 will operably control flow of the main hydraulic pump 412 until the requisite amount of fluid is provided to cool the brakes.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A motorized vehicle having an engine for providing power, comprising:
   a transmission having an input coupled to the engine for receiving power, and an output configured to transfer the power to one or more wheels on the vehicle;
   a controller for controlling at least the transmission;
   a braking system of the vehicle including a brake sensor and a brake pack configured to reduce a speed of the vehicle, the brake sensor disposed in electrical communication with the controller;
   a main hydraulic pump operably driven by the engine and adapted to provide hydraulic fluid to the transmission;
   an output hydraulic pump operably driven by the transmission output; and
   a brake coolant valve disposed in fluid communication with the main hydraulic pump and the output hydraulic pump, the brake coolant valve being operably controlled between an open position and a closed position;
   wherein, the main hydraulic pump and the output hydraulic pump are fluidly coupled to the brake pack when the brake coolant valve is in its open position, and at least the output hydraulic pump is not fluidly coupled to the brake pack when the brake coolant valve is in its closed position.

2. The vehicle of claim 1, wherein the controller is disposed in electrical communication with the main hydraulic pump and the output hydraulic pump.

3. The vehicle of claim 1, wherein the brake coolant valve comprises an electro-hydraulic valve, and the controller is disposed in electrical communication with the brake coolant valve.

4. The vehicle of claim 3, wherein the controller operably controls the brake coolant valve between its open and closed positions.

5. The vehicle of claim 1, further comprising a speed sensor disposed in electrical communication with the controller, the speed sensor configured to detect a vehicle speed, an engine speed or a transmission output speed.

6. The vehicle of claim 1, further comprising a brake input device operably controlled between a first position and a second position, the first position corresponding to the brake pack being in an applied state, and the second position corresponding to the brake pack being in a released state.

7. The vehicle of claim 6, wherein the brake sensor is disposed in communication with the brake input device and detects movement thereof between the first and second position.

8. The vehicle of claim 6, wherein the brake coolant valve is operably controlled to its open position when the brake input device is in its first position, and the brake coolant valve is operably controlled to its closed position when the brake input device is in its second position.

9. A method of providing an amount of hydraulic fluid to a braking system of a vehicle during or after a braking event, comprising:
   providing an engine, a transmission having an input and an output, a controller, a main hydraulic pump, an output hydraulic pump, a brake coolant valve, a brake pack, a speed sensor, and a brake input sensor;
   receiving a first signal from the brake input sensor indicating the brake pack is in an engaged position;
   communicating a first speed of the vehicle to the controller from the speed sensor when the brake pack is in its engaged position;
   receiving a second signal from the brake input sensor indicating the brake pack is in a disengaged position;
   communicating a second speed of the vehicle to the controller with the speed sensor when the brake pack is in its disengaged position;
   determining an amount of energy absorbed by the brake pack when the brake pack was in its engaged position, the amount of energy absorbed being a function of a vehicle mass, the first speed, and the second speed;
   determining an amount of hydraulic fluid to supply to the brake pack as a function of the amount of energy absorbed;
   operably controlling the brake coolant valve to an open position; and
   supplying the amount of hydraulic fluid from the main hydraulic pump and the output hydraulic pump to the brake pack.

10. The method of claim 9, further comprising determining a first pump flow of the main hydraulic pump and a second pump flow of the output hydraulic pump, where the first and second pump flows are a function of pump capacity, pump speed, and time.

11. The method of claim 9, further comprising operably controlling the brake coolant valve from its open position to a closed position once the amount of hydraulic fluid has been supplied to the brake pack.

12. The method of claim 9, wherein the determining an amount of energy absorbed step comprises multiplying the vehicle mass by a difference between the first and second speeds.

13. The method of claim 9, wherein the determining an amount of hydraulic fluid step comprises calculating the amount of hydraulic fluid based on the amount of energy absorbed, brake plate geometry of at least one brake plate in the brake pack, hydraulic fluid temperature, and at least one thermal property of the brake pack.

14. The method of claim 9, wherein the supplying step comprises fluidly coupling the main hydraulic pump and the output hydraulic pump to the brake pack.

15. The method of claim 14, further comprising fluidly de-coupling the output hydraulic pump from the brake pack after the supplying step.

16. A method of supplying hydraulic fluid to reduce a temperature of a brake pack of a vehicle after a braking event, comprising:
- providing an engine, a transmission having an input and an output, a controller, a main hydraulic pump, an output hydraulic pump, a brake coolant valve, a brake pack including at least one brake plate, a speed sensor, a brake input sensor, and a brake pressure sensor;
- receiving a signal from the brake input sensor indicating the brake pack is engaged during the braking event;
- detecting a vehicle speed of the vehicle with the speed sensor and a brake pressure of the brake pack during the braking event;
- communicating the vehicle speed and brake pressure to the controller;
- determining an amount of energy absorbed by the brake pack during the braking event, the amount of energy absorbed being a function of the brake pressure, the vehicle speed, a piston area of an apply piston to the brake pack, a radius of the at least one brake plate, and a number of brake plates in the brake pack;
- determining an amount of hydraulic fluid to supply to the brake pack as a function of the amount of energy absorbed;
- operably controlling the brake coolant valve to an open position; and
- supplying the amount of hydraulic fluid from the main hydraulic pump and the output hydraulic pump to the brake pack.

17. The method of claim 16, further comprising operably controlling the brake coolant valve from its open position to a closed position once the amount of hydraulic fluid has been supplied to the brake pack.

18. The method of claim 16, wherein the determining an amount of hydraulic fluid step comprises calculating the amount of hydraulic fluid based on the amount of energy absorbed, brake plate geometry of at least one brake plate in the brake pack, hydraulic fluid temperature, and at least one thermal property of the brake pack.

19. The method of claim 16, wherein the supplying step comprises fluidly coupling the main hydraulic pump and the output hydraulic pump to the brake pack.

20. The method of claim 19, further comprising fluidly de-coupling the output hydraulic pump from the brake pack after the supplying step.

* * * * *